(12) United States Patent
Interdonato

(10) Patent No.: US 12,359,997 B2
(45) Date of Patent: Jul. 15, 2025

(54) CALIBRATION DEVICE FOR DYNAMOMETRIC TOOLS

(71) Applicant: ATLAS COPCO INDUSTRIAL TECHNIQUE AB, Stockholm (SE)

(72) Inventor: Attilio Alessandro Interdonato, Paderno Dugnano (IT)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 221 days.

(21) Appl. No.: 17/999,074

(22) PCT Filed: May 21, 2021

(86) PCT No.: PCT/IB2021/054412
§ 371 (c)(1),
(2) Date: Nov. 17, 2022

(87) PCT Pub. No.: WO2021/234652
PCT Pub. Date: Nov. 25, 2021

(65) Prior Publication Data
US 2023/0175913 A1    Jun. 8, 2023

(30) Foreign Application Priority Data

May 22, 2020  (IT) .......................... 102020000012106

(51) Int. Cl.
*G01L 25/00* (2006.01)
*B25B 23/142* (2006.01)

(52) U.S. Cl.
CPC ........ *G01L 25/003* (2013.01); *B25B 23/1422* (2013.01)

(58) Field of Classification Search
CPC .................. G01L 25/003; B25B 23/1422
See application file for complete search history.

(56) References Cited

U.S. PATENT DOCUMENTS 4,470,312 A  *  9/1984  Thompson ................ G01L 3/10
73/862.08
5,099,678 A  *  3/1992  Grabovac ............ G01L 25/003
73/862.08
(Continued)

FOREIGN PATENT DOCUMENTS

CN    210719488 U  *  6/2020
CN    111044215 B  *  9/2021    ........... G01L 25/003
(Continued)

OTHER PUBLICATIONS

International Search Report issued on Sep. 6, 2021 in PCT/IB2021/054412 filed on May 21, 2021, 2 pages.
(Continued)

*Primary Examiner* — Octavia Hollington
(74) *Attorney, Agent, or Firm* — Oblon, McClelland, Maier & Neustadt, L.L.P.

(57) ABSTRACT

A calibration device for dynamometric tools including a sliding mechanical structure associated with a frame of a test bench, which allows to impart a force and a controlled rotation in such a torque tool, said tool having its clamping tool engaged in a brake placed on the bench. The mechanical structure includes a pair of longitudinal bars which can be connected to the bench, on which at least one guide is mounted transversely, on this guide there is a support which slides in the transverse direction and is provided with a constraint for the tool body, so that the tool is pivoted on the brake with its tool head and can rotate to simulate a tightening of the brake F when the support is moved along this guide.

6 Claims, 2 Drawing Sheets

(56) References Cited

U.S. PATENT DOCUMENTS

| | | | | |
|---|---|---|---|---|
| 6,609,407 | B1* | 8/2003 | Tambini | G01L 25/003 |
| | | | | 73/1.09 |
| 7,757,540 | B2* | 7/2010 | Dabrowski | G01L 25/003 |
| | | | | 73/1.12 |
| 7,885,780 | B2* | 2/2011 | Lucke | G01L 25/003 |
| | | | | 702/108 |
| 8,117,887 | B2* | 2/2012 | Schwafertz | G01L 25/003 |
| | | | | 73/1.01 |
| 9,250,170 | B2* | 2/2016 | Su | G01N 3/22 |
| 9,410,863 | B2* | 8/2016 | Nichols | G01L 25/003 |
| 2009/0217773 | A1 | 9/2009 | Schwafertz et al. | |

FOREIGN PATENT DOCUMENTS

| | | |
|---|---|---|
| DE | 10 2014 016 892 B3 | 4/2016 |
| EP | 0 332 545 A1 | 9/1989 |
| FR | 2627860 A1 * | 9/1989 |
| WO | WO-2023161790 A1 * | 8/2023 |

OTHER PUBLICATIONS

International Preliminary Report on Patentability issued on Sep. 22, 2022 in PCT/IB2021/054412 filed on May 21, 2021, 17 pages.

\* cited by examiner

CALIBRATION DEVICE FOR DYNAMOMETRIC TOOLS

The present invention relates to a calibration device for torque or dynamometric tools.

Calibration devices for torque wrenches, such as the one described in patent application US20090217773, are known which comprise a mechanical slidable structure which can be mounted on a frame of a test bench or which can operate independently and which allows a controlled force and rotation to be imparted to a torque wrench. Such a wrench has its clamping tool, or tool head, engaged in a brake provided with transducer which simulates a conventional tightening of a bolt, for example.

By means of such a calibration device it is possible to compare, on the basis of a known force or torque and angle imparted by the calibration device, the torque measured by the wrench through its sensors and the torque measured by the transducer on the brake.

All the measurements taken determine whether the wrench exerts the correct tightening torque and, if necessary, the correct tightening angle in normal use, and shows this accurately on its display. In case of discrepancies, the wrench can be recalibrated based on the measurements taken.

Standard UNI ISO 6789 of 2017 establishes the obligation to verify and calculate the uncertainty of the torque tool, together with the increase of the measurement interval, provides a very useful indication to operators regarding the reproducibility of the accuracy of their tool and at the same time makes the difference in terms of quality between tool manufacturers even more evident. Operators will have access to fundamental information about the wrench purchased: in addition to quantifying the accuracy of the wrench, which is already an indication of the quality of the wrench itself, the operator will be informed of the degree of uncertainty of the measurement made by the wrench. The higher the calculated uncertainty value, the greater the difference between the accuracy value measured during certification and the value actually applied by the operator. Those responsible for maintenance, who must work within very precise protocols, will therefore have to equip themselves with tools which ensure a very low degree of measurement uncertainty in order to be sure of adhering to those protocols. The standard specifies a method for calibrating hand-held torque tools and describes the method of calculating the measurement of calibration uncertainties.

In the calibration devices of known type there is an important drawback related to the application point of the force which is not tangent to the trajectory of the wrench at all the points of movement. The trajectory of the wrench is obviously dependent on the angle of rotation of the tool head and covers a wide arc depending on the length of the arm.

The above standard states that force(s) shall be applied to the wrench handle at a constant radial distance. Therefore, the force exerted must always be tangent to the trajectory traversed by the wrench handle.

The fact that the application point of the force is not tangent to the trajectory of the wrench means that the force applied to the tool handle is not constant but undergoes variations which make the measurement inaccurate with respect to that indicated in the standard.

FIG. 1 illustrates a typical device such as that described in patent application US20090217773 in which the slide S moved by the rotation of the handle M imparts a force Fr to the wrench C which rotates accordingly for a desired angle. The application point of the real applied force Fr does not result tangent to the trajectory of the wrench at all the points of movement. Such a distance is in fact not constant with respect to the fulcrum of movement and consequently the force component will also vary during the movement. The ideal trajectory T of the force application point Ft is different from the actual trajectory.

The present invention proposes to overcome the aforementioned drawbacks by obtaining a calibration device in which the force applied to the wrench is always arranged in a direction tangential to the curved trajectory carried out by the handle of the wrench itself.

One aspect of the present invention relates to a calibration device having the features of the appended claim 1.

Further features of the invention are highlighted by the dependent claims.

The features and advantages of the device according to the present invention will be more apparent from the following description, which is to be understood as exemplifying and not limiting, with reference to the schematic attached drawings, wherein.

Figure 1:
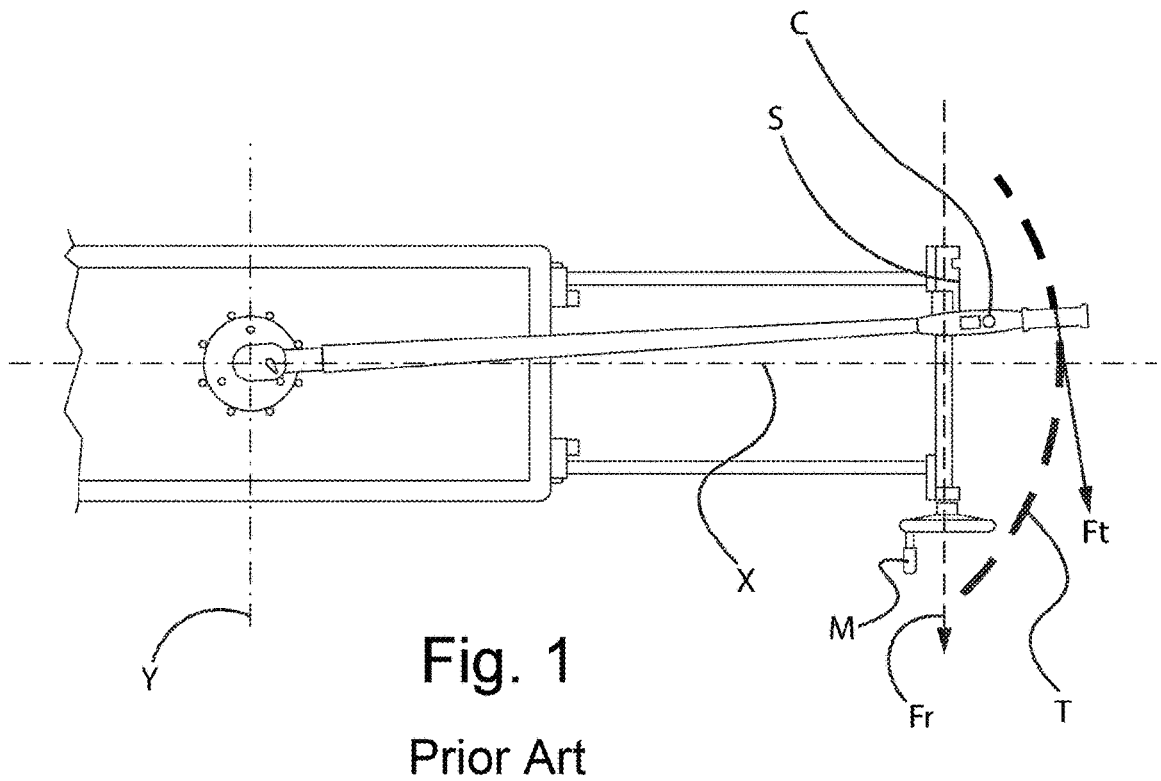
FIG. 1 is a schematic view from above of a calibration device according to the prior art.
Figure 2:
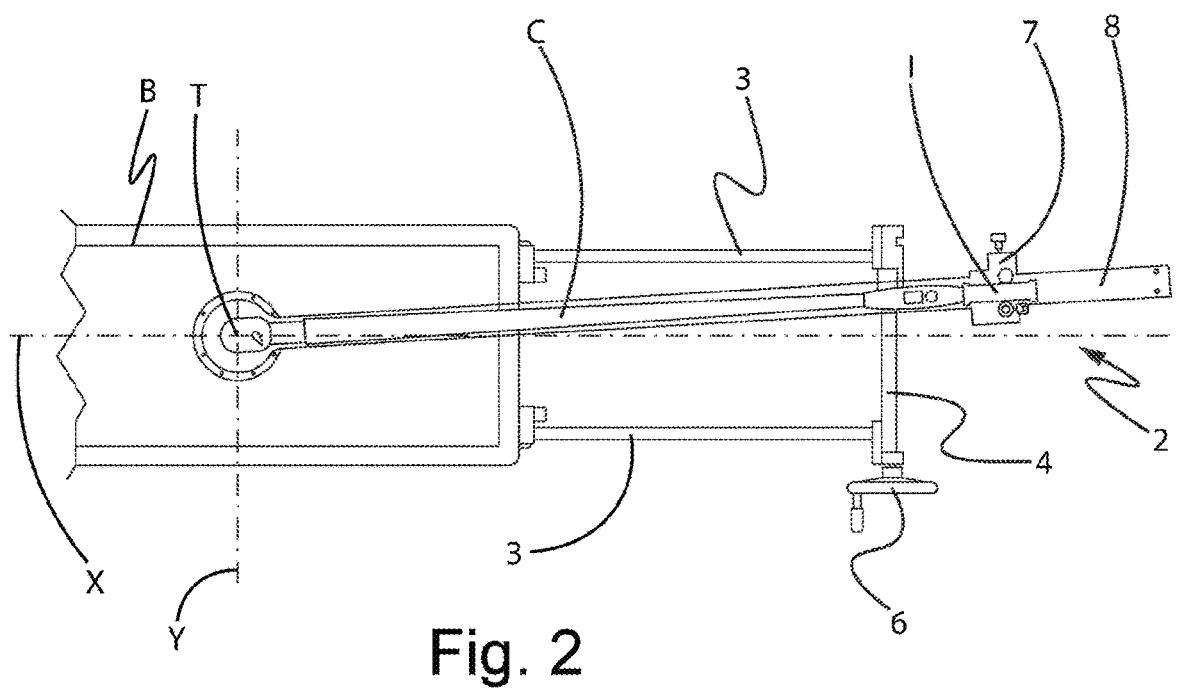
FIG. 2 is a schematic view from above of a calibration device according to an embodiment of the present invention.
Figure 3:
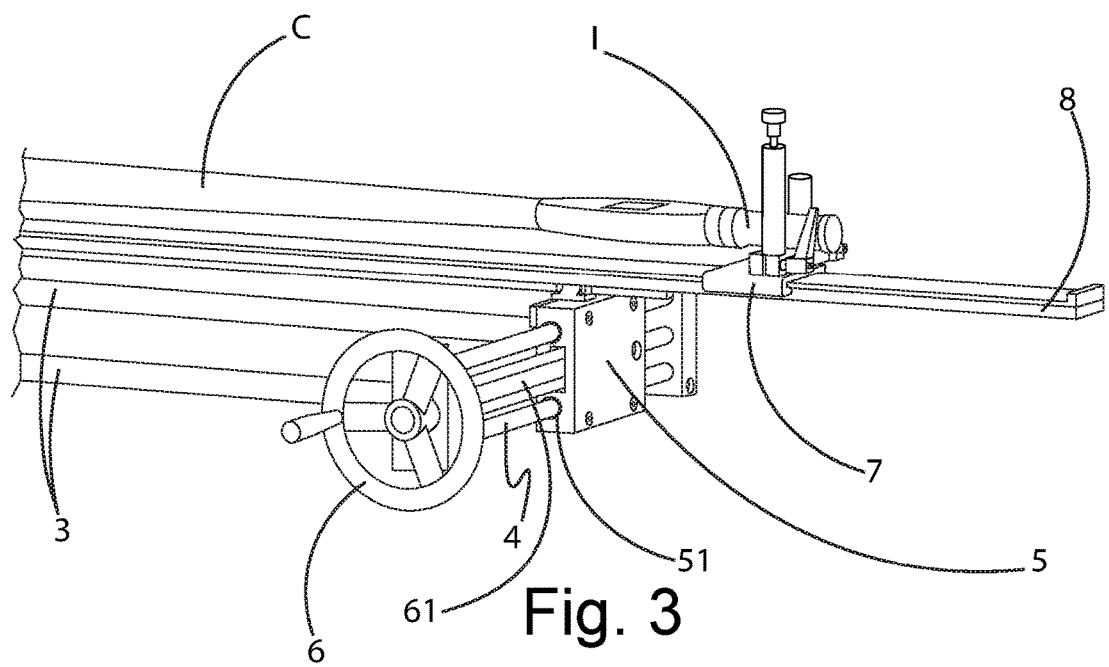
FIG. 3 is a further schematic view from above of a calibration device according to an embodiment of the present invention.

With reference to the aforementioned figures, the calibration device for a torque tool such as, for example, a torque wrench, comprises a sliding mechanical structure 2 which can be mounted associated or combined in general, on a frame of a test bench B which allows to read the torque when imparting a force and a controlled rotation to said torque wrench C. Said wrench has its tightening tool, or tool head T, engaged in a brake F or similar device, preferably provided with a transducer for measuring the torque imparted thereon, which simulates a conventional tightening of, for example, a bolt.

Said mechanical structure comprises a pair of longitudinal bars 3 which can be connected to said test bench, preferably on its sides and preferably at equal distance from the centre of rotation R of said brake F, on which at least one guide 4 is transversely mounted which can also possibly slide in the longitudinal direction X with respect to the bars in order to reposition itself.

A support 5 provided with suitable restraining means for the wrench body can slide on such a guide in the transverse direction Y.

The support 5 is moved along the guide by movement means, which can be manual or automatic (motorized). In the embodiment shown, such means are made by means of a worm mechanism in which a crank 6 rotates a worm 61 which penetrates a threaded hole 51 of the support 5.

Thereby, the wrench remains pivoted on the brake with its tool head and can rotate to simulate a clamping of the brake F when the support is moved along the guide 4.

According to the present invention, the means for constraining the wrench body to the support 5 comprise a slide 7 to which the handle 1 of the wrench is attached, which slides along a slider 8 parallel to the wrench which at one end thereof is pivoted on the brake fulcrum F and can rotate around it and, preferably at an intermediate portion thereof or near the other end thereof, is constrained to the support 5. Thereby, the support allows the slider and the tool to rotate together.

The tool or wrench C is superimposed on the slider 8, so that the latter acts as a base for it.

Figure 4:
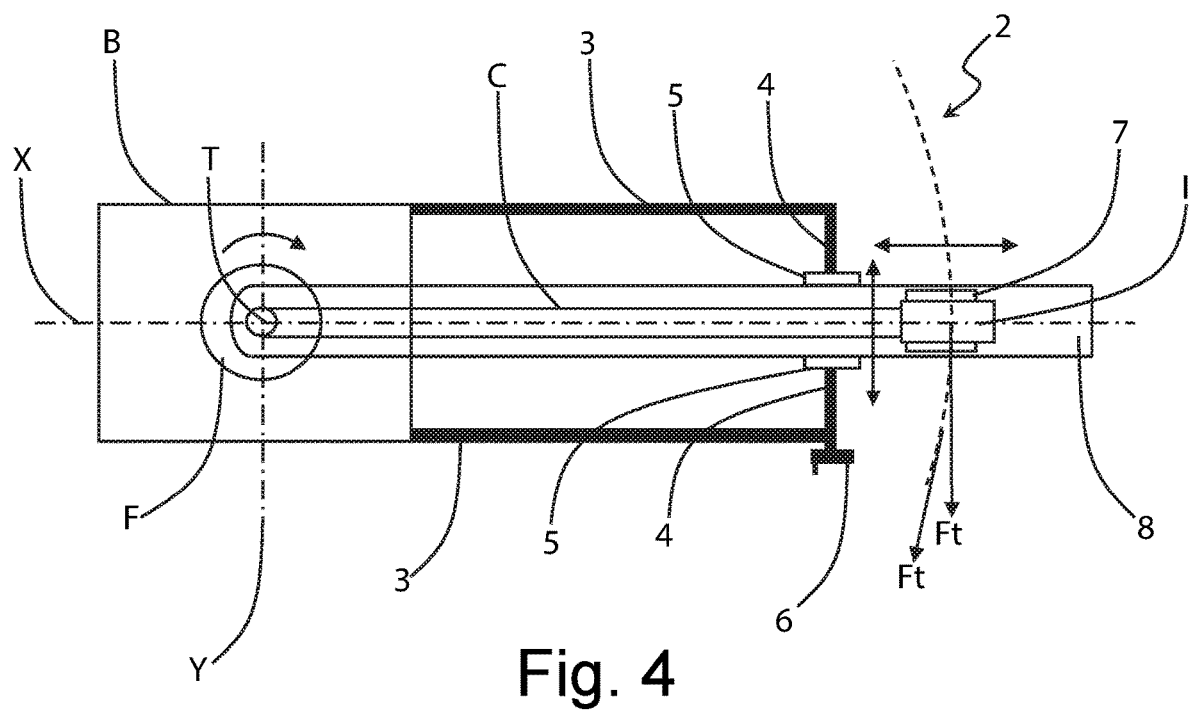
FIG. 4 is a perspective view of the device of FIG. 2.

The slide 7 which can move longitudinally mutually with the handle or grip of the wrench along the slider 8 allows the radial distance of the point of application of force to be kept constant, as illustrated in FIG. 4.

The invention claimed is:

1. A calibration device for dynamometric tools comprising a sliding mechanical structure configured to be mounted to a frame of a test bench, which allows to impart a force and a controlled rotation in such a dynamometric tool, said tool having a clamping tool engaged in a brake placed on the bench, which simulates a clamping of a bolt, said mechanical structure comprises a pair of longitudinal bars configured to be connected to said bench, on which at least one guide is mounted transversely, on this guide there is a support which slides by means of movement means in the transverse direction and is provided with constraint means for the tool body, so that the tool is pivoted on the brake with a tool head and can rotate to simulate a tightening of the brake when the support is moved along this guide, wherein said means for constraining the tool body to the support comprise a slide to which a handle of the tool is fixed, which slides longitudinally along a slider on which the tool is superimposed so that the slider acts as a base for the tool, and wherein one end of said slider is pivoted on a brake fulcrum and can rotate around the fulcrum, said slider being constrained to the support, so that the support allows the slider and the tool to rotate together, such that the force applied to the tool is always arranged in a direction tangential to a curved trajectory carried out by the handle of the tool itself.

2. The device according to claim 1, wherein said bars are arranged on sides of the bench and at an equal distance from a rotation center of said brake.

3. The device according to claim 1, wherein said support movement means is manual or automatic/motorized.

4. The device according to claim 3, wherein said support movement means are made by means of a worm mechanism in which a crank rotates a worm which penetrates a threaded hole of the support.

5. The device according to claim 1, wherein the slider is constrained to the support in an intermediate portion thereof or near an end opposite the one pivoted on the brake.

6. The device according to claim 1, wherein the guide slides in a longitudinal direction along the bars to reposition itself.

* * * * *